(12) United States Patent
Normann et al.

(10) Patent No.: US 6,633,229 B1
(45) Date of Patent: Oct. 14, 2003

(54) METHOD FOR ASSIGNING IDENTIFYING ELEMENTS IN SIGNALS EMITTED BY TRANSMITTERS IN A TIRE PRESSURE INDICATING SYSTEM TO THE WHEELS ON WHICH THE TRANSMITTERS ARE MOUNTED

(75) Inventors: Norbert Normann, Niefern-Öschelbronn (DE); Roland Michal, Lustenau (AU); Ralf Kessler, Pfinztal (DE); Andreas Kühnle, Maulbronn (DE); Lothar Gunter Schulze, Ispringen (DE)

(73) Assignee: Beru Aktiengesellschaft, Ludwigsburg (DE)

( * ) Notice: Subject to any disclaimer, the term of this patent is extended or adjusted under 35 U.S.C. 154(b) by 0 days.

(21) Appl. No.: 09/868,007

(22) PCT Filed: Dec. 8, 1999

(86) PCT No.: PCT/EP99/09648

§ 371 (c)(1),
(2), (4) Date: Jul. 25, 2001

(87) PCT Pub. No.: WO00/34062

PCT Pub. Date: Jun. 15, 2000

(30) Foreign Application Priority Data

Dec. 9, 1998 (DE) .......................................... 198 56 861

(51) Int. Cl.⁷ ............................................... B60C 23/00
(52) U.S. Cl. ........................ 340/447; 340/445; 340/448; 340/447; 73/146.5; 73/146.2; 73/146.8; 200/61.22; 200/61.25; 116/34 R
(58) Field of Search ................................ 340/442, 445, 340/447, 448; 73/146.2, 146.5, 146.8; 200/61.22, 61.25; 116/34 R

(56) References Cited

U.S. PATENT DOCUMENTS

| | | | | | |
|---|---|---|---|---|---|
| 5,033,295 | A | * | 7/1991 | Schmid et al. | 73/146.5 |
| 5,614,882 | A | * | 3/1997 | Latarnik et al. | 340/444 |
| 6,018,993 | A | * | 2/2000 | Normann et al. | 73/146.5 |
| 6,181,241 | B1 | * | 1/2001 | Normann et al. | 340/447 |

FOREIGN PATENT DOCUMENTS

| | | |
|---|---|---|
| DE | 19608478 | 5/1997 |
| DE | 19608479 | 5/1997 |
| DE | 19618658 | 11/1997 |
| DE | 19728419 | 2/1999 |
| DE | 19735686 | 2/1999 |
| EP | 0760299 | 7/1996 |

* cited by examiner

Primary Examiner—Daniel J. Wu
Assistant Examiner—Hung Nguyen
(74) Attorney, Agent, or Firm—Horst M. Kasper

(57) ABSTRACT

A method for allocating identifiers, that are contained in signals issued by transmitters arranged in a tire pressure monitoring system, to the positions of the wheels by transmitting the signals to a receiving and analysis circuit, which analyses the information, contained in the signal, wherein for differentiating between wheels on the right side of the vehicle and wheels on the left side of the vehicle, the sign of a translation acceleration b is determined for each running wheel, the sign of the variation of the centrifugal acceleration z occurring during the translation acceleration b is additionally determined and multiplied by the sign of the translation acceleration b determined for the respective wheel, and the differentiation between wheels on the right side of the vehicle and wheels on the left side of the vehicle is effected by comparing the products of the two signs determined for the wheels.

18 Claims, No Drawings

METHOD FOR ASSIGNING IDENTIFYING ELEMENTS IN SIGNALS EMITTED BY TRANSMITTERS IN A TIRE PRESSURE INDICATING SYSTEM TO THE WHEELS ON WHICH THE TRANSMITTERS ARE MOUNTED

BACKGROUND OF THE INVENTION

The present invention proceeds from a
method for allocating identifiers, that are contained in signals issued by transmitters arranged in a tire pressure monitoring system,
comprising a pressure sensor, a transmitter and a transmission antenna on each of a number of vehicle wheels, one or more receiving antennas on the vehicle body, and an electronic receiving and analysis system connected to such antennas by wire,
to the positions of the wheels on which the transmitters are arranged, by picking up the signals, containing the identifier, by the one or more receiving antennas, transmitting them to the electronic receiving and analysis system and analyzing them by means of the latter with respect to their identifier, as prior art.

A method of this kind has been known from DE 196 08 478 A1. The known tire pressure monitoring system comprises on each wheel of a vehicle a pressure sensor, an electronic analysis circuit connected to the pressure sensor, a transmitter, a transmission antenna and a battery which latter supplies the electronic systems on the wheels (hereinafter referred to as wheel electronics) with current. Provided on the vehicle body, adjacent the wheels, are receiving antennas which are connected via cable to a central receiving and analysis circuit (hereinafter referred to as central electronic analysis system).

A problem encountered with such tire pressure monitoring systems is unequivocal allocation of the transmitters to the respective position of the wheel on the vehicle. To solve this problem, the transmitters generate a signal divided into four segments, consisting of preface, identification signal, measurement signal, and conclusion. The central electronic system can recognize the position of the transmitting wheel of the vehicle based on the identification signal (identifier). Doing so, however, requires previous unequivocal allocation of the identifier to the respective wheel position and storing of that allocation in the central electronic analysis system. DE 196 08 478 A1 discloses a possibility of performing that allocation automatically, based on the signals transmitted by the wheel electronics, after the initial assembly of the wheels on the vehicle or after a wheel change. To this end, the intensity of the signals received is analyzed statistically: Although each receiving antenna receives signals from all transmitting vehicle wheels, one starts out from the assumption that the signals obtained from the wheel the closest to the respective receiving antenna will be received with the greatest intensity, taking the statistical mean value.

A similar allocation system is known from DE 196 08 479 A1.

The known allocation methods are connected with the disadvantage that they cause considerable costs in connection with the tire pressure monitoring system because a separate receiving antenna must be provided in the neighborhood of each wheel, and must be connected via an antenna cable to the central electronic analysis system in the vehicle.

As a solution to the problem to provide a lower-cost possibility of achieving automatic allocation of the identifiers, that have been transmitted by the wheel electronics, to specific wheel positions, DE 197 35 686 A1 discloses a method with the features specified in the preamble of claim 1.

DE 197 35 686 A1 provides to configure the wheel electronics arranged on each wheel in such a way that it will not only measure the tire pressure and transmit it to the central electronic analysis system, but will in addition determine information on the moving condition of the wheel and transmit that information to the central electronic analysis system. Based on the moving condition of the wheel the central electronic analysis system will then derive a datum on the position of the respective wheel on the vehicle.

SUMMARY OF THE INVENTION

According to the invention, useful information on the moving condition of the wheel is derived from the acceleration occurring on the wheel. The acceleration signals provided by an acceleration sensor connected to the wheel electronics are either evaluated in the wheel electronics, whereafter the results of such evaluation are transmitted to the central electronic analysis system, or are inserted by the wheel electronics into the signal to be regularly transmitted and are then transmitted to and evaluated in the central electronic analysis system.

Miniaturized semiconductor-based acceleration sensors that can be integrated at relatively low cost into the wheel electronics anyway required, are available in the market. The additional input to the wheel electronics connected with such integration is considerably lower than the costs saved by the elimination of receiving antennas and their cabling.

DETAILED DESCRIPTION OF THE INVENTION

Information regarding the wheel position can be derived from acceleration signals, obtained on the wheel, in the following ways:

1. Turning of the wheel gives rise to centrifugal acceleration on the wheel. Only spare wheels carried in the vehicle will show no centrifugal acceleration even with the vehicle in moving condition. Signals that are received in the moving condition of the vehicle, but that indicate a centrifugal acceleration of z=0, are therefore allocated to a spare wheel in the vehicle.

2. The magnitude of the centrifugal acceleration occurring on the wheel depends on the speed of the wheel. If the magnitude of the centrifugal acceleration z is integrated over a predetermined period of time in the central electronic receiving and analysis system, then the magnitude of the integrated measurand provides a measure of the path the wheel has traveled during that period of time. Given the fact that when cornering the steered front wheels of the vehicle travel a longer distance than the non-steered rear wheels, the integrated measurand of a steered front wheel will be greater than that of a non-steered rear wheel. The identifiers contained in the signals that lead to the greatest integrated measurands for the centrifugal acceleration z can therefore be allocated to the steered front wheels of the vehicle.

3. When the acceleration sensors are mounted on the wheel in corresponding positions, then the acceleration sensor on a wheel on the right side of the vehicle and the acceleration sensor on a wheel on the lift side of the vehicle will provide acceleration signals with opposite signs during acceleration of the vehicle. In this connection, the acceleration component arising in the circumferential direction of the wheel during acceleration (or deceleration) is called acceleration along the path b. The sign of the signal representing the acceleration along the path permits to differentiate between right and left wheels, the sign being preferably determined already by the wheel electronics and then transmitted to the central electronic analysis system. Most suitably, the differentiation between right and left wheels is effected in the acceleration phase following the start of the vehicle.

After the identifier of the spare wheel has been derived from the centrifugal acceleration z, and the wheels located on the right side and the wheels located on the left side of the vehicle have been identified based on the acceleration along the path b, the remaining differentiation between front wheels and rear wheels can be effected with a reduced number of antennas on the receiving side, as compared with the prior art, by allocating a single common receiving antenna to those wheels that are located on a common axle of the vehicle, rather than by evaluating integrated measurands for the centrifugal acceleration z. The differentiation between the different axles can then be effected by statistical evaluation of the intensities of the signals received in the same way as disclosed by DE 196 08 478 A1 or DE 196 08 479 A1, except that a separate antenna is no longer required on the vehicle for each wheel, but a common receiving antenna will suffice for wheels that are arranged on a common axle.

4. For differentiating between the steered front wheels and the non-steered rear wheels of a vehicle, it is also possible, according to another development of the invention, to observe and evaluate the occurrence of Coriolis acceleration on the steered wheel. Coriolis acceleration will not occur on non-steered wheels, but will occur on steered wheels when steering movements are performed. When the wheel signals that Coriolis acceleration occurred, then it is clear that the wheel concerned must be one of the steered front wheels.

The centrifugal acceleration z acts perpendicularly to the acceleration along the path b. Coriolis acceleration in its turn acts perpendicularly to the centrifugal acceleration z and to the acceleration along the path b.

An acceleration sensor capable of differentiating between acceleration along three axes of coordinates, or an arrangement of three acceleration sensors sensitive to acceleration along three different axes of coordinates, are suited with advantage for use in connection with the present invention. However, as has been explained above, the invention can be carried out not only with a triaxial acceleration sensor, but also with the aid of a biaxial acceleration sensor and/or an arrangement of two acceleration sensors, one of them being capable of picking up the centrifugal acceleration z and allowing to determine the spare wheel, to differentiate between steered front wheels and non-steered rear wheels and between deceleration and acceleration of the vehicle, and the other one permitting to detect the acceleration along the path b encountered on the wheel electronics, and its sign, and thereby to differentiate between right and left wheels.

The wheel electronics of the different wheels are independent one from the other so that normally they will not transmit signals simultaneously. The signals received from different wheels, that are compared in the central electronic analysis system in order to determine the position on the vehicle where the wheel characterized by a specific identifier is located, must therefore be intermediately stored in the central electronic analysis system to permit their comparison. The central electronic analysis system must therefore be equipped with a volatile memory suited for this purpose. It is part of the common knowledge of any man of the art that this can be realized in a simple way, for example by means of a microprocessor, which additionally may serve to analyze the signals received. Since the signals to be compared are not generated simultaneously, it may happen that a signal obtained from a right wheel, which was generated during acceleration of the vehicle, is compared with a signal obtained from a left wheel, which was generated during deceleration of the vehicle. In this case, it is not possible to differentiate between right and left wheels solely by the acceleration along the path b. The invention therefore provides that when determining the acceleration along the path b and its sign on each wheel the variation of the centrifugal acceleration z over time is simultaneously determined and transmitted to the central electronic analysis system together with the acceleration along the path b and its sign. The sign of the variation over time (dz/dt) of the centrifugal acceleration z indicates if the vehicle was accelerated (positive sign) or decelerated (negative sign). By jointly evaluating the sign of the variation over time (dz/dt) of the centrifugal acceleration z and the sign of the acceleration along the path b for each wheel, it is now possible to unequivocally differentiate between right wheels and left wheels. The simplest way to do so is to form in the central electronic analysis system the product of those signs for each wheel, which will provide opposite signs for wheels on the left vehicle side, compared with wheels on the right vehicle side, for the acceleration along the path b, regardless of whether the vehicle was accelerated or decelerated. This is, however, dependent on the precondition that the acceleration sensors have their two axes, along which they respond for determining the acceleration along the path b and the centrifugal acceleration z, identically oriented in relation to the respective wheel, which is guaranteed for otherwise identical wheel electronics by the fact that they are arranged on the different wheels in corresponding mounting positions.

Let it be assumed, for example, that the sign of the acceleration along the path b is positive on a right wheel when the vehicle is accelerated; then the sign will be negative for the left wheel, and the sign for the variation over time (dz/dt) of the centrifugal acceleration z will be positive for both wheels. The product of the signs is determined by the following formula:

For the right wheel: sign $(dz/dt)\cdot$sign $b=(+1)(+1)=+1$, for the left wheel: sign $(dz/dt)\cdot$sign $b=(+1)(-1)=-1$.

Thus, the left wheel and the right wheel differ one from the other by the sign of the product.

Let it be assumed that the signal on the right wheel was generated while the vehicle was accelerated, whereas the signal on the left wheel was generated while the vehicle was decelerated. Then the product of the signs is:

For the right wheel: sign $(dz/dt)\cdot$sign $b=(+1)(+1)=+1$, for the left wheel: sign $(dz/dt)\cdot$sign $b=(-1)(+1)=-1$.

Thus, the same differentiation between the right wheel and the left wheel, based on the product of signs, is obtained as in the case discussed first.

Once this differentiation has been made between left and right wheels, it is then possible, with the aid of only two antennas, one allocated to the wheels on the front axle of the vehicle and the other one allocated to the wheels on the rear axle of the vehicle, to tell which of the left wheels is a front wheel and which is a rear wheel and which of the right wheels is a front wheel and which is the rear wheel, by evaluating the intensity (receiving amplitude) of the signals received. For, an antenna arranged in the area of the front axle will in average receive signals arriving from the front axle with greater amplitude than signals arriving from the rear axle. Conversely, an antenna arranged in the area of the rear axle will in average receive signals obtained from the rear wheels with greater amplitude than signals obtained from the front wheels. This not even requires that the antennas be arranged midway between the right and the left wheels; an off-center arrangement is also possible, since there is always the possibility to differentiate between front and rear wheels by combining the information on the sense of rotation and the receiving amplitude.

It would even be possible to do with only a single antenna, by arranging it either closer to the front axle or closer to the rear axle, so that it would be capable of receiving signals from all four wheels with sufficient intensity. For determining the signal intensities it is possible to make use not only of a single signal, but also of a series of several signals obtained from one and the same wheel, in order to improve the accuracy of intensity determination. With respect to a statistical method suited for this purpose, express reference is made to the disclosure of DE 196 08 478 A1 and of DE 196 08 479 A1.

What is claimed is:

1. A method for allocating identifiers, that are contained in signals issued by transmitters arranged in a tire pressure monitoring system, comprising a pressure sensor, a transmitter and a transmission antenna on each of a number of wheels mounted at given position of a vehicle, one or more receiving antennas on a vehicle body, and an electronic receiving and analysis system connected to the antennas by wire, to the positions of the wheels on which the transmitters are arranged, by picking up the signals, containing the identifier, by the one or, more receiving antennas, transmitting them to the electronic receiving and analysis system and analyzing them by means of the latter with respect to their identifier, for which purpose one measures on the wheels of which the tire pressure is monitored not only the tire pressure but in addition an acceleration value derived from a moving condition of the respective wheel, transmits a signal derived therefrom by means of the respective transmitter to the receiving and analysis system and analyses an information, contained in the signal, identifying the position of the wheel from which the signal has been obtained, characterized in that for differentiating between wheels on the right side of the vehicle and wheels on t he left side of the vehicle, the sign of a transition acceleration b occurring on wheel electronics comprising the pressure sensor, the transmitter, the transmitting antenna and an acceleration sensor is determined for each running wheel, the wheel electronics being provided on the different wheels in corresponding mounting positions, that the sign of the variation of a centrifugal acceleration z occurring during the transition acceleration b is additionally determined and multiplied by the sign of the transition acceleration b determined for the respective wheel to obtain a multiplication products of the signs, and that one differentiates between wheels on the right side of the vehicle and wheels on the left side of the vehicle by comparing the products of the two signs determined for the different wheels.

2. The method as defined in claim 1, characterized in that the sign of the acceleration along the path b is determined already in an electronic analysis circuit provided on the wheel as part of the wheel electronics.

3. The method as defined in claim 1, characterized in that a single common receiving antenna is allocated to wheels arranged on a common axle of the vehicle.

4. The method as defined in claim 1, characterized in that a signal, that is received while the vehicle is moving and that indicates a centrifugal acceleration of z=0, is allocated to a spare wheel carried in the vehicle.

5. The method as defined in claim 1, characterized in that for differentiating between steered and non-steered wheels of the vehicle, signals indicating the magnitude of the measured centrifugal acceleration are integrated over a predetermined period of time, the steered wheels being allocated those signals that provide the highest integrated measurands.

6. The method as defined in claim 1, characterized in that for differentiating between steered wheels and non-steered wheels of the vehicle, the occurrence of Coriolis acceleration during steering movements is determined, signaled and evaluated.

7. The method as defined in claim 5, characterized in that a single antenna is used only for all the signal-transmitting wheels of the vehicle.

8. The method as defined in one of claims 1, characterized in that signals obtained from the front wheels are distinguished from signals obtained from rear wheels by comparing the intensities of the signals received by the respective receiving antenna and that in observing the receiving antenna allocated to the front wheels the stronger signals are allocated to the front wheels and the weaker signals are allocated to the rear wheels, while in observing the receiving antenna allocated to the rear wheels the stronger signals are allocated to the rear wheels and the weaker signals are allocated to the front wheels.

9. A method for allocating identifiers, that are contained in signals issued by transmitters arranged in a tire pressure monitoring system, comprising a pressure sensor, a transmitter and a transmission antenna on each of a number of wheels mounted at given positions of a vehicle, one or more receiving antennas on a vehicle body, and an electronic receiving and analysis system connected to the antennas by wire, to positions of the number of wheels on which the transmitters are arranged, by picking up the signals, containing the identifier, by the one or, more receiving antennas, transmitting them to the electronic receiving and analysis system and analyzing them by means of the latter with respect to their identifier, for which purpose one measures on monitored wheels not only a pressure in the tire but in addition an acceleration value derived from a moving condition of the respective wheel, transmits a signal derived therefrom by means of the respective transmitter to the electronic receiving and analysis system and analyses an information, contained in the signal, identifying the position of the wheel from which the signal has been obtained, characterized in that for differentiating between wheels on the right side of the vehicle and wheels on the left side of the vehicle, the sign of a transition acceleration (b) occurring on wheel electronics comprising the pressure sensor, the transmitter, the transmitting antenna and an acceleration sensor is determined for each running wheel, the wheel electronics being provided on the different wheels in corresponding mounting positions, that the sign of the variation of a centrifugal acceleration (z) occurring during the transition acceleration (b) is additionally determined and multiplied by the sign of the transition acceleration (b) determined for the respective wheel to obtain a multiplication product of the sign of the variation of the centrifugal acceleration (z) and of the transition acceleration (b), and that one differentiates between wheels on the right side of the vehicle and wheels on the left side of the vehicle by comparing the products of the two signs determined for the different wheels.

10. A method for allocating identifiers contained in signals issued by transmitters arranged in a tire pressure monitoring system, comprising furnishing a first wheel electronics comprising a first pressure sensor, a first transmitter, a first transmitting antenna and a first acceleration sensor being provided on a first wheel mounted to a right band side of a vehicle and furnishing a first wheel electronics, wherein the first wheel electronics is furnished in a first mounting position on the first wheel, furnishing a second wheel electronics comprising a second pressure sensor, a second transmitter, a second transmitting antenna and a second acceleration sensor being provided on a second wheel mounted to a left hand side of the vehicle and furnishing a second wheel electronics, wherein the second wheel electronics is furnished in a second mounting position on the second wheel,;

mounting a receiving antenna on a vehicle body;

connecting an electronic receiving and analysis system to the receiving antenna by a wire;

monitoring not only the first tire pressure of the first wheel, but in addition a first acceleration value derived from a first moving condition of the first wheel;

monitoring not only the second tire pressure of the second wheel, but in addition a second acceleration value derived from a second moving condition of the second wheel;

transmitting a first signal derived from the first tire pressure of the first wheel and the first acceleration value by means of the first transmitter to the receiving antenna;

transmitting a second signal derived from the second tire pressure of the second wheel and the second acceleration value by means of the second transmitter to the receiving antenna;

picking up the first signal containing a first identifier by the receiving antenna;

picking up the second signal containing a second identifier by the receiving antenna;

transmitting the first signal and the second signal to the electronic receiving and analysis system and analyzing the first signal and the second signal in the electronic receiving and analysis system with respect to the first identifier and to the second identifier;

analyzing first information, contained in the first signal;

analyzing second information, contained in the second signal, determining a first sign of a first tangential acceleration (b1) occurring in the first wheel electronics for the first wheel and determining a second sign of a second tangential acceleration (b2) occurring in the second wheel electronics for the second wheel;

additionally determining a third sign of the variation of a first centrifugal acceleration (z1) occurring in the first wheel electronics during the first tangential acceleration (b1); multiplying the first sign of the first tangential acceleration (b1) determined for the first wheel by the third sign of the variation of the first centrifugal acceleration (z1) to obtain a first multiplication product of the first sign and of the second sign, additionally determining a fourth sign of the variation of a second centrifugal acceleration (z2) occurring in the second wheel electronics during the second tangential acceleration (b2);

multiplying the second sign of the second tangential acceleration (b2) determined for the second wheel bz the fourth sign of the variation of the second centrifugal acceleration (z2) to obtain a second multiplication product of the second sign and of the fourth sign;

differentiating between the first wheel on the right side of the vehicle and the second wheel on the left side of the vehicle by comparing the first multiplication product and the second multiplication product.

11. The method according to claim 10 further comprising furnishing a first electronic analysis circuit on the first wheel for determining the first sign of the variation of the first tangential acceleration; furnishing a second electronic analysis circuit on the second wheel for determining the second sign of the variation of the second tangential acceleration.

12. The method according to claim 10 further comprising arranging a single receiving antenna on a common axle of the first wheel and of the second wheel.

13. The method according to claim 10 further comprising allocating a signal, that is received while the vehicle is moving and that indicates a centrifugal acceleration of z =0, to a spare wheel carried in the vehicle.

14. The method according to claim 10 further comprising integrating the first signal indicating the magnitude of the measured centrifugal acceleration over a predetermined period of time, integrating the second signal indicating the magnitude of the measured centrifugal acceleration over the predetermined period of time, allocating a steered wheel to that integrated signal, which integrated signal provides the highest integrated measurands for differentiating between a steered and a non-steered wheel of the vehicle.

15. The method according to claim 10 further comprising determining, signaling and evaluating an occurrence of a Coriolis acceleration during steering movements for differentiating between a steered wheel and a non-steered wheel of the vehicle.

16. The method according to claim 14, wherein a single receiving antenna is used for the first wheel and for the second wheel of the vehicle.

17. The method according to claim 10 further comprising distinguishing a signal obtained from a front wheel from a signal obtained from a rear wheel of the vehicle by comparing the intensities of the signals received by a respective receiving antenna;

observing with a receiving front antenna allocated to the front wheel, and allocating a stronger signal to the front wheel and allocating a weaker signal to a rear wheel;

observing with a receiving rear antenna allocated to the rear wheel, and allocating a stronger signal to the rear wheel and allocating a weaker signal are to a front wheel.

18. A tire pressure monitoring system, comprising a first pressure sensor;

a first transmitter;

a first transmitting antenna;

a first acceleration sensor, wherein the first pressure sensor, the first transmitter, the first transmitting antenna and the first acceleration sensor are provided on a first wheel mounted to a right hand side of a vehicle and furnish a first wheel electronics;

a second pressure sensor;

a second transmitter;

a second transmitting antenna;

a second acceleration sensor, wherein the second pressure sensor, the second transmitter, the second transmitting antenna and the second acceleration sensor are provided on a second wheel mounted to the left hand side of the vehicle and furnish a second wheel electronics;

a receiving antenna mounted on a vehicle body;

a wire;

an electronic receiving and analysis system connected to the receiving antenna by the wire;

wherein not only the first tire pressure of the first wheel is monitored, but in addition a first acceleration value derived from a first moving condition of the first wheel;

wherein not only the second tire pressure of the second wheel is monitored, but in addition a second acceleration value derived from a second moving condition of the second wheel;

wherein a first signal derived from the first tire pressure of the first wheel and the first acceleration value is transmitted by means of the first transmitter to the receiving antenna;

wherein a second signal derived from the second tire pressure of the second wheel and the second acceleration value is transmitted by means of the second transmitter to the receiving antenna;

wherein the first signal containing a first identifier is picked up by the receiving antenna;

wherein the second signal containing a second identifier is picked up by the receiving antenna;

wherein the first signal and the second signal are transmitted to the electronic receiving and analysis system and wherein the first signal and the second signal are analyzed in the electronic receiving and analysis system with respect to the first identifier and to the second identifier;

wherein first information, contained in the first signal is analyzed;

wherein second information, contained in the second signal is analyzed, for identifying the position of the first wheel from which the first signal has been obtained and for identifying the position of the second wheel from which the second signal has been obtained;

wherein a first sign of a first tangential acceleration (b1) occurring in the first wheel electronics for the first wheel is determined and wherein the second sign of a second tangential acceleration (b2) occurring in the second wheel electronics for the second wheel is determined for differentiating between the first wheel on the right side of the vehicle and the second wheel on the left side of the vehicle;

wherein additionally a third sign of the variation of a first centrifugal acceleration (z1) occurring during the first tangential acceleration (b1) is determined;

wherein the first sign of the variation of the first tangential acceleration (b1) determined for the first wheel is determined to obtain a multiplication product of the third sign of the variation of the first centrifugal acceleration (z1) and of the first sign of the variation of the first tangential acceleration (b1);

wherein additionally a fourth sign of the variation of a second centrifugal acceleration (z2) occurring during the second tangential acceleration (b2) is determined, wherein the second sign of the variation of the second tangential acceleration (b2) determined for the second wheel is determined to obtain a multiplication product of the fourth sign of the variation of the second centrifugal acceleration (z2) and of the second sign of the variation of the second tangential acceleration (b2);

wherein between the first wheel on the right side of the vehicle and the second wheel on the left side of the vehicle is differentiated by comparing the multiplication product of the of the third sign of the variation of the first centrifugal acceleration (z1) and of the first sign of the variation of the first tangential acceleration (b1) with the multiplication product of the fourth sign of the variation of the second centrifugal acceleration (z2) and of the second sign of the variation of the second tangential acceleration (b2).

* * * * *